United States Patent
Eltschka et al.

(12) 
(10) Patent No.: US 6,883,039 B1
(45) Date of Patent: Apr. 19, 2005

(54) METHOD FOR OPTIMIZED PROCESSING OF CONNECTIONS CONDUCTED OUTSIDE A SWITCHING CENTER

(75) Inventors: Herwig Eltschka, Starnberg (DE);
Norbert Löbig, Darmstadt (DE)

(73) Assignee: Siemens Aktiengesellschaft, Munich (DE)

( * ) Notice: Subject to any disclaimer, the term of this patent is extended or adjusted under 35 U.S.C. 154(b) by 1042 days.

(21) Appl. No.: 09/722,116

(22) Filed: Nov. 27, 2000

(51) Int. Cl.$^7$ .................................................. G06F 3/00
(52) U.S. Cl. ........................ 710/9; 710/12; 710/15; 718/1; 718/102; 718/105
(58) Field of Search ................. 710/8, 9, 15; 718/1, 718/101, 102, 105

(56) References Cited

U.S. PATENT DOCUMENTS 6,134,614 A * 10/2000 Chari et al. ................. 710/302
6,529,996 B1 * 3/2003 Nguyen et al. ............. 711/114
6,728,770 B1 * 4/2004 Bradford et al. ............ 709/226

\* cited by examiner

*Primary Examiner*—Jeffrey Gaffin
*Assistant Examiner*—Alan Chen
(74) *Attorney, Agent, or Firm*—Laurence A. Greenberg; Werner H. Stemer; Ralph E. Locher

(57) ABSTRACT

The method enables optimization of the processing of connections conducted outside a switching center in peripheral devices of a switching system, which provide no HW-orientated tasks on their peripheral devices assigned in switching terms. The operating system of the peripheral device and the security engineering running thereon permit quasi-parallel processing of a multiplicity of virtual peripheral devices. It is thereby possible to address every virtual peripheral device with a dedicated logic address via the message interface of the physically assigned peripheral device.

7 Claims, 3 Drawing Sheets

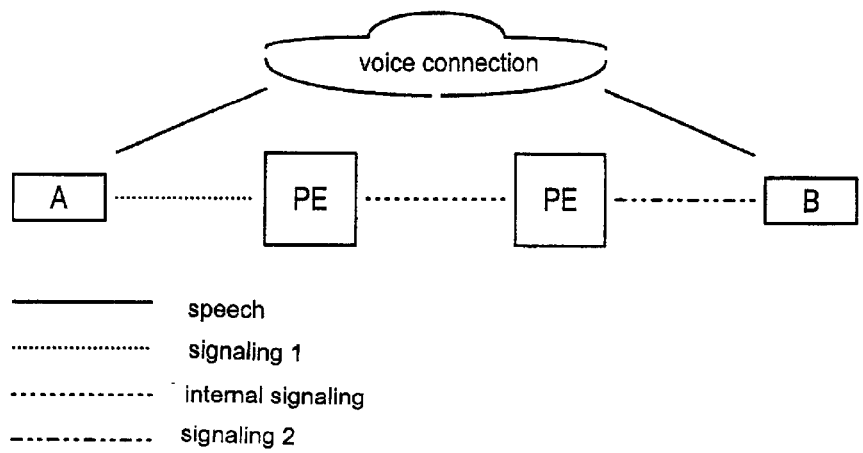
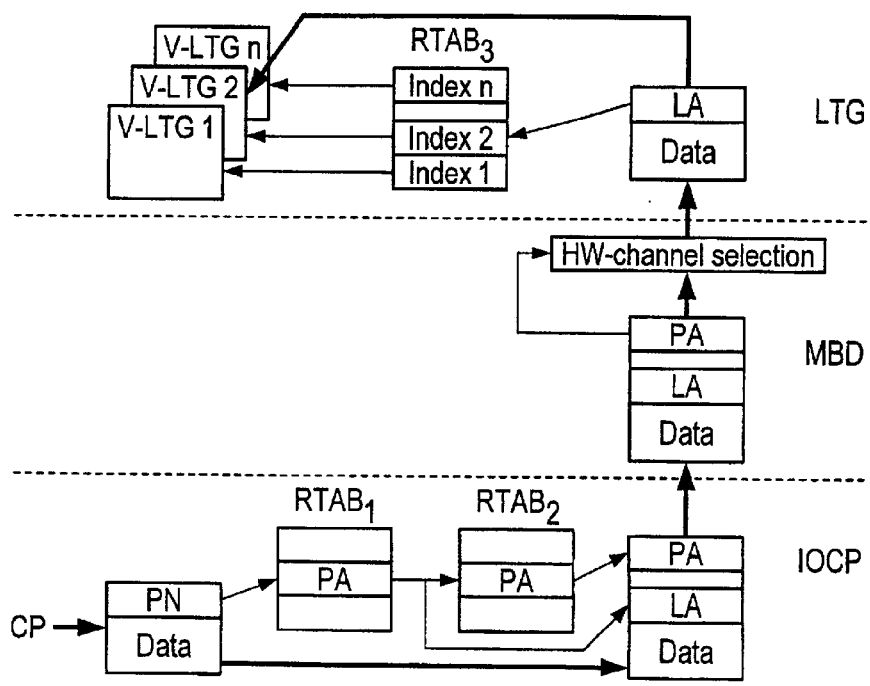

001
METHOD FOR OPTIMIZED PROCESSING OF CONNECTIONS CONDUCTED OUTSIDE A SWITCHING CENTER

BACKGROUND OF THE INVENTION

Field of the Invention

The invention relates to a method for optimized processing of connections conducted outside a switching center in peripheral devices of a switching system, which provide no HW-orientated tasks on their peripheral devices assigned in switching terms.

In the prior art, a switching node has peripheral devices (connecting devices for subscribers or lines), a central computer platform, a message distributing device and further, central units (switching unit, protocol terminating devices (for example #7), backing store, servers). The corresponding relationships are reproduced in FIG. 1.

The peripheral devices fulfil essential switching tasks associated with the voice channels of the peripheral device. They therefore include switching, operating and administrative programs and the data information, associated with the device, such as position, signaling, authorizations, call numbers, individual characteristics of connection lines and subscriber lines as well as the state of expansion and configuration of the peripheral device.

The central computer platform provides the coordinating control of the setting up and clearance of connections and reactions to administrative and fault-induced changes in configuration.

The peripheral devices are connected via the message distribution system to one another and to the common computer platform. The further central system components make special functions available to the switching system, for example for switching through the voice channels, processing the signaling protocols, implementing the operator interface or storing bulk data.

For reasons of dependability, the central components of a switching system are designed redundantly (for example doubled). The peripheral devices cannot be redundant, nor possess redundancy in the case of more stringent failure requirements (for example, rescuing stable connections after the failure of a peripheral device).

The performance of the peripheral devices is determined by the performance of the processors of the peripheral device. Furthermore, the size of the pools of conference points, tone generators and DTMF receivers, which are useful in terms of switching, and the capacity of the protocol terminating device (HDLC ports and message throughput) are essential for judging the performance of the peripheral devices. Also an important factor are the number of the terminated lines per peripheral device, the message interface for signaling messages (DSS1/ISUP) and packet data on the D channel, the internal interface to the message distribution system and the size of the data memory.

If signaling and voice are conducted disassociated on separate paths, and if the peripheral devices only have the task of protocol processing and/or protocol conversion without physical termination of the voice channels, the limitations of the peripheral devices with regard to resource pool and number of terminable voice channels are eliminated. For this application, the capacity of the peripheral device is determined by the performance of the processors, the size of the memory, and the capacity of the message interface.

Since more than one direction must be made available for switching through the voice between a subscriber A and an arbitrary subscriber B, there are generally always two different peripheral devices PE participating in the setting up and clearance of connections (see FIG. 2).

The peripheral device of the prior art terminates precisely those connection lines for whose processing in terms of switching it is responsible. There are usually peripheral devices for terminating n PCM30 links (for example n=4 for 120 junction lines). In the case of the present application, in which the voice is conducted outside the peripheral device, the limitation to the physically determined maximum number of terminable junction lines is dispensed with. For this case of use, a peripheral device can simultaneously process more than 120 connections.

Without adapting the software of the switching center, for the previously named case of use as well, the peripheral device can process only the maximum number, determined by physical termination, of simultaneous connections. With regard to optimization for that case of use, simply increasing the connections processed per peripheral device has repercussions on all devices of the switching system up to and including input and output operations. Because of the resulting large outlay on change, this mode of procedure is certainly sound in structural terms, but it is not economical.

The following technical problem therefore arises:

How can a peripheral device which is used for signaling conversion be used with regard to its performance, its memory and its message interface in an optimum fashion such that, in particular, the limitations owing to the pool of hardware resources which is present per peripheral device play no role such that the outlay on software changes in the switching system is minimized and the internal interfaces to other devices of the switching system are not affected, such that the failure response of the entire system is not worsened in the event of failure of a peripheral device in the said application, and that no connections/subscribers drop out because of the failure of the peripheral device until the latter is restarted.

In this prior art background, peripheral devices always refer to hardware. They are the units which physically terminate junction lines to subscriber-line concentrators and subscriber lines. If only signaling protocols are to be terminated or converted, this is performed on devices without physical line reference. Such general useful devices are mostly a central constituent of the switching system, redundancy generally being provided in order to achieve the required dependability.

It is a problematic feature of this mode of procedure that the terminating hardware provided in the peripheral device, and the switching resources made available in the peripheral device remain unused when this peripheral device is used in switching terms to handle voice channels not actually conducted in the switching center. Furthermore, without extensive software adaptations, the restrictions stemming from the classical application are maintained, for example switching through no more than the maximum number of junction lines which can be terminated in the classic application. The peripheral device is therefore suboptimal for connections conducted outside the switching center. If the central devices, used for pure protocol applications, of the switching center are to be used for the novel application, the switching software of the peripheral devices must be ported onto the latter. This means substantial software changes, something which is cost intensive with regard to the quantity of programs to be ported, and is therefore problematical.

A method for software upgrading of peripheral devices as they are being operated is proposed in German patent application 96108175.9. That prior art method opens up the possibility of simultaneously designing two different software programs on the same physical peripheral device. Only one of the two programs respectively has access to the hardware of the peripheral device. However, that functionality is available not for ongoing operation, but only for the period of the actual software exchange.

SUMMARY OF THE INVENTION

The object of the invention is to provide a method of optimizing the processing of connections guided outside of an exchange which overcomes the above-noted deficiencies and disadvantages of the prior art devices and methods of this kind, and which provides a configuration of peripheral devices for treating, in switching terms, voice channels which are not actually connected through the switching center, doing so in conjunction with optimum use of the switching resources.

With the above and other objects in view there is provided, in accordance with the invention, a method of optimized processing of connections conducted outside a switching center in peripheral devices of a switching system, which provide no hardware oriented tasks on the peripheral devices assigned in switching terms, which comprises permitting with an operating system of the peripheral device and security engineering running thereon quasi-parallel processing of a multiplicity of virtual peripheral devices, and addressing virtual peripheral devices with a dedicated logic address via a message interface of the physically assigned peripheral device.

In accordance with an added feature of the invention, messages are distributed within the peripheral device with a central operating system section on the basis of a destination address, co-supplied via the message distribution system, of a virtual peripheral device.

In accordance with an additional feature of the invention, messages are distributed to virtual peripheral devices via flexibly loaded routing tables of the message distribution system.

In accordance with another feature of the invention, there is administered a number of the virtual peripheral devices per peripheral device in dependence on performance, message interface, amount of memory, and application.

In accordance with a further feature of the invention, a loading of software into a virtual peripheral device is supported via the same physical message channel of the assigned peripheral device.

In accordance with yet a further feature of the invention, in a case of permanent total failure of a peripheral device, the routing tables of the message distribution system are updated, and then a reserved peripheral device is loaded with a program and data of the failed virtual peripheral devices and taking the reserved peripheral device into operation automatically without reacting on the further devices of the switching system.

In accordance with a concomitant feature of the invention, the method comprises rescuing stable connections for duplicate-design peripheral devices or 1:1 redundant unduplicated peripheral devices, simultaneously updating the switching data memories and states of the virtual peripheral devices of the redundant unit per logic updating channel or updating channel physically present in the peripheral device.

It is particularly advantageous in the invention that the operating system used in the peripheral devices, and the respectively assigned security engineering permit quasi-parallel processing of n virtual peripheral devices. It is possible for each virtual peripheral device to be addressed by means of a dedicated logic address via the message interface of the physically assigned peripheral device.

Other features which are considered as characteristic for the invention are set forth in the appended claims.

Although the invention is illustrated and described herein as embodied in a method for optimized processing of connections conducted outside a switching center, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a schematic showing separate paths of voice and signaling between two subscribers A and B;

FIG. 3 is a schematic illustrating the routes of a message from a central control device CP to a virtual peripheral device V-LTG 2;

DESCRIPTION OF THE PREFERRED EMBODIMENTS

Figure 1:
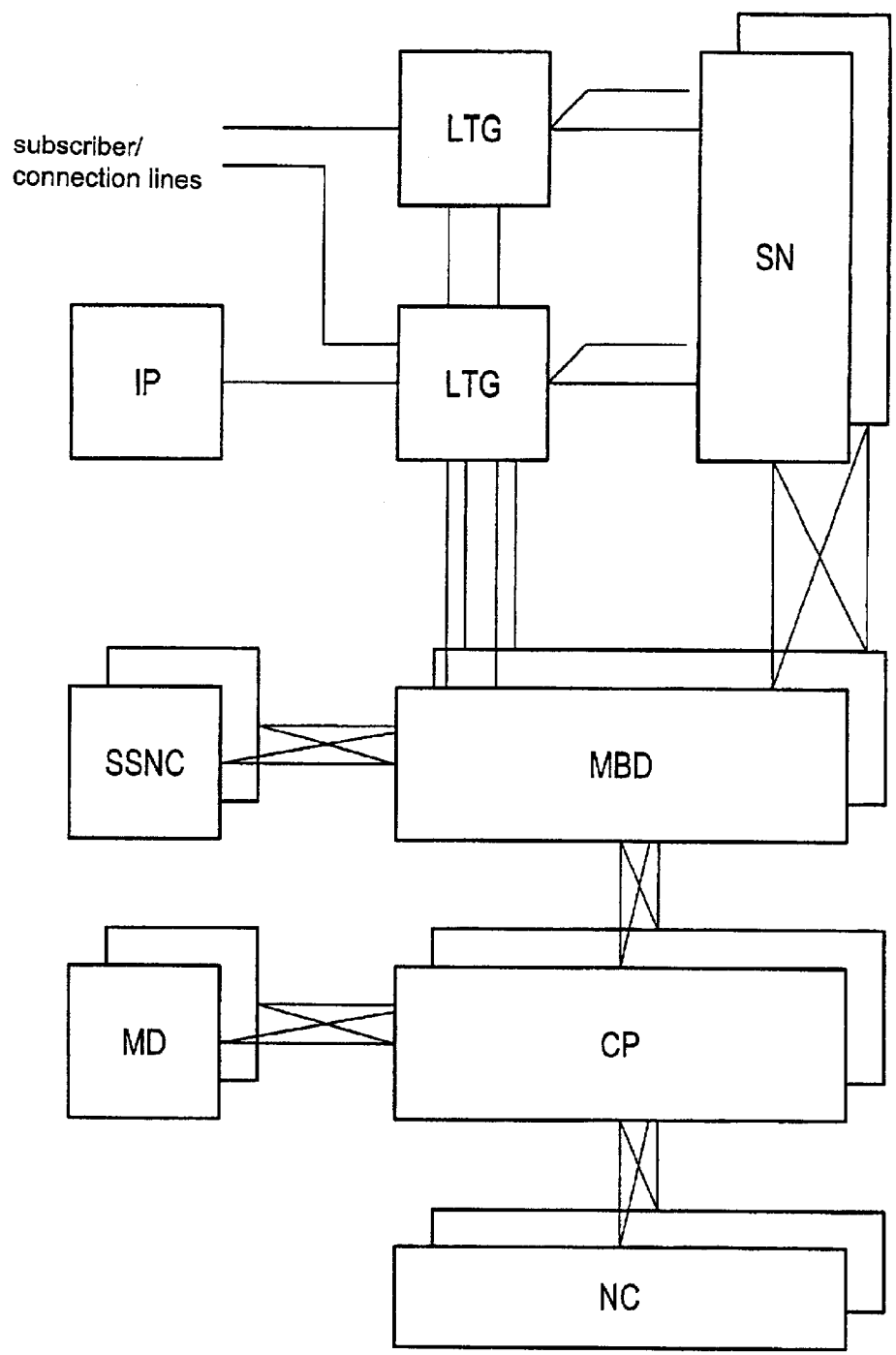
FIG. 1 is a block diagram of a typical architecture of a switching system with nonduplicated peripheral terminal units.

Referring now to the figures of the drawing in detail and first, particularly, to FIG. 1 thereof, there is seen a typical structure of a switching system. Peripheral devices LTG, a central computer platform or central processor CP, a message distribution device MBD and further, central units (switching unit SN, protocol terminating devices (for example SSNC), backing stores MD, servers NC, intelligent peripherals IP) are illustrated.

The paths for voice information and signaling information between two subscribers A, B are shown in FIG. 2. There, voice and signaling information is led over different paths. Two peripheral devices PE of a switching system are inserted into the path provided for the signaling information.

The operating system running on the peripheral device, and the hardware-based security programs of the peripheral device are changed according to the invention in such a way that they support a number n virtual peripheral devices which are active on the same hardware basis. This can be performed, for example, by means of generalized task changing which is supported by descriptor tables assigned to the virtual peripheral devices, or paging tables.

In particular, a central program is provided for distributing the messages which reach a peripheral device which is actually present. This has the function of further distributing messages to the virtual peripheral devices running on a physical peripheral device. This is effected with the aid of their logic addresses. Each virtual peripheral device has a logic address which is unique in the switching system and which is equivalent to the address of an actually existing peripheral device. In this way, each unit in the switching system can address a virtual peripheral device without reaction in the system.

Virtual peripheral devices running on the same physical peripheral device use the same interface to the message distribution system. The assignment between the virtual peripheral device and a peripheral device present in terms of hardware is performed administratively.

The message distribution system is adapted in such a way that it supports the addressing of different logic peripheral devices via the same message channel. This means that the message distribution system uses the logic address of the virtual peripheral devices to find the physical message channel via which the output is to be performed. So that the message in the peripheral device can be delivered to the correct virtual peripheral device, the logic destination address is co-transmitted as part of the message header and used in the above-mentioned central program section of the peripheral device for further distribution to the addressed virtual peripheral device.

The security engineering of the peripheral device with virtual sections is adapted in such a way that the failure or the re-availability of a peripheral device is particularly simple:

If the hardware of the peripheral device fails, this leads to the failure of all virtual devices running on this device. If the hardware comes into operation again after the reloading of the software or after a repair, this leads to re-availability of the functions of the associated virtual peripheral devices. For reasons of simplicity, the temporary failure, caused by software errors, of a virtual peripheral device can likewise be mapped onto the temporary nonavailability of all virtual peripheral devices running on the assigned peripheral device. This means that the program defect detected and reported by a virtual peripheral device leads in the simplest case to the decommissioning of the entire peripheral device and to the automatic recommissioning after reloading of the peripheral device.

The loader program for loading program and data sections of the backing memory into the peripheral device is adapted in such a way as to permit selective loading of all data of the virtual peripheral devices assigned to one peripheral device. This is effected via the same physical channel. If the program of all virtual peripheral devices on a physical peripheral device is identical, it is possible for the purpose of optimization to dispense with the repeated loading of the same program sections.

The number of the virtual peripheral devices which can run on a peripheral device is determined from the performance of the processors used on the peripheral device, the memory size, and the performance of the message interface to the remainder of the system. If, in particular, the interface to the message distribution system is not powerful enough, it is possible to switch additional message paths, which relieve or circumvent the message distribution system, between peripheral devices and further devices of the switching system.

Figure 4:
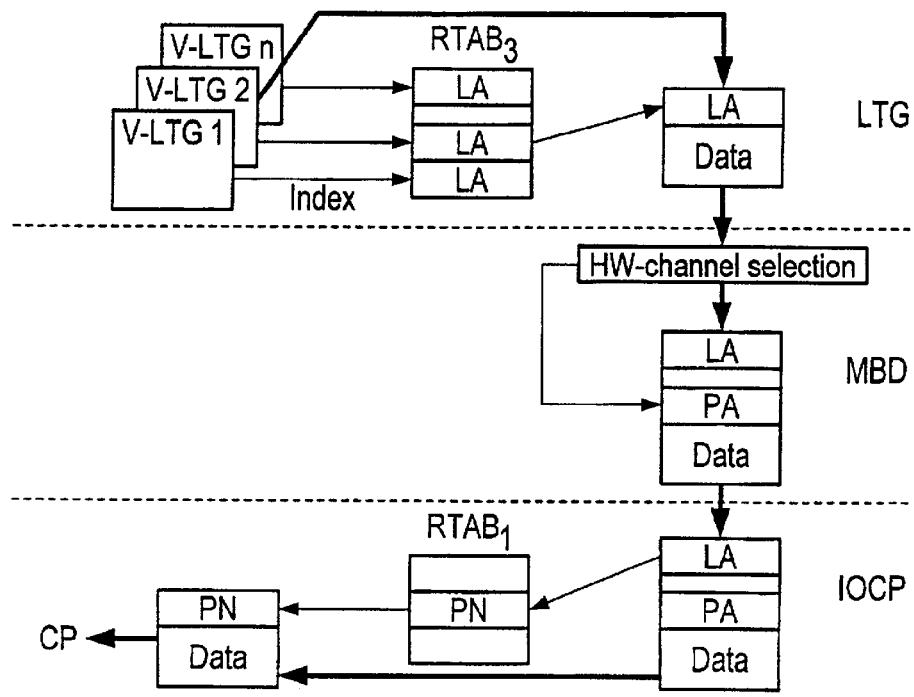
FIG. 4 is a schematic illustrating the routes of a message from a virtual peripheral device V-LTG 2 to the central control device CP.
Figure 5:
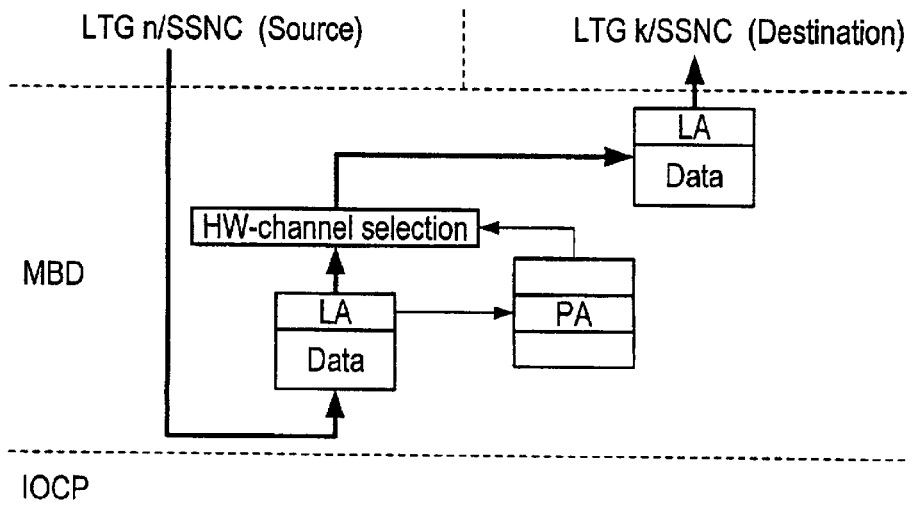
FIG. 5 is a schematic showing the relationships in the message distributor MBD.

A permanent HW (hardware) failure of a peripheral device leads to the loading of a peripheral device, held ready in reserve, with the data of the affected virtual peripheral devices, for the purpose of updating the tables, present in the message distribution system, for assigning the addresses of the virtual peripheral devices to the physical message channels via which they can be reached, as well as for the purpose of automatically recommissioning the virtual peripheral devices formerly assigned to the failed peripheral device. A corresponding routing picture of the message distribution system of the switching system EWSD is shown in FIGS. 3, 4, and 5. Permanent nonavailability of subscribers and junction lines is avoided with the creation of redundancy and activation of the affected virtual peripheral devices on another peripheral device.

The hardware structure of the peripheral devices, in particular the number of the voice channels terminated by a device, greatly influences the structure of the switching-related database and the processing software SW. Several times the switching capacity for connections conducted outside the switching center can be provided at the same place in a peripheral device by raising the performance of the processors and by reducing the dimensions of the hardware terminating the voice channels.

The method described can be used for the purpose of rendering such compressions invisible to the user SW running in the system, by making available several virtual devices of previous structure and number of voice channels on an actually existing device.

It is shown by way of example in FIG. 3 how a message is transferred in a communications system from the central control device CP to a virtual peripheral device V-LTG 2. In accordance therewith, a block with messages DATA and a processor number PN is emitted. The latter is a number which is converted in routing tables $RTAB_1$, $RTAB_2$ into a logic or physical address. While the first designates the virtual peripheral device, the physical peripheral device assigned to the latter is addressed by the physical address. The messages DATA, the logic address LA, and the physical address PA are transferred together to the message distributor MBD via the input/output device IOCP of the central control device CP.

A check is now made in the message distributor MBD as to the hardware channel in which the received data block of the physical peripheral device LTG in question is being fed (HW-channel selection). This physical peripheral device LTG takes over the data block, the operating system carrying out an evaluation of the logic address. The received (long) logic address LA is converted into a short index number in a further routing table $RTAB_3$. In accordance with the present exemplary embodiment, this is to be the index number Index2, with the aid of which the virtual peripheral device V-LTG 2 is addressed.

FIG. 4 shows how messages are fed in a communication system from a virtual peripheral device (for example V-LTG 2) to a central control device CP. The virtual peripheral device V-LTG 2 generates a block with messages DATA and a number Index2 corresponding to the virtual peripheral device V-LTG 2. Said number is converted in the routing table $RTAB_3$ into a (long) logic source address LA. The block is now fed to the message distributor MBD in a hardware channel, via which the physical source address PA is determined. Messages DATA, logic address LA and physical address PA are subsequently transferred to the input/output device IOCP of the central control device CP. The routing table $RTAB_1$ converts the logic source address LA into the processor number PN characteristic of the control device CP.

The relationships in the message distributor MBD are shown in FIG. 5. It is provided in this case that virtual peripheral devices V-LTG$_n$, V-LTG$_k$ exchange messages between one another. Alternatively, it is also possible to exchange messages between a virtual peripheral device V-LTG$_n$, V-LTG$_k$ and the central signaling channel SSNC. The message block is received by the message distributor MBD from a source (SOURCE). Messages DATA and a logic destination address LA are contained therein. The physical destination address PA is determined on the basis of this destination address LA with the aid of a routing table located in the message distributor MBD. The hardware channel selection is driven via the physical destination address PA to output to a sink (DESTINATION) the data block containing the logic destination address. The physical address PA is therefore used to determine the competent physical message channel and to branch the destination LTG or the SSNC (DESTINATION).

We claim:

1. A method of optimized processing of connections conducted outside a switching center in peripheral devices of a switching system, which provide no hardware oriented tasks on the peripheral devices assigned in switching terms, which comprises permitting with an operating system of the peripheral device and security engineering running thereon quasi-parallel processing of a multiplicity of virtual peripheral devices, and addressing virtual peripheral devices with a dedicated logic address via a message interface of the physically assigned peripheral device.

2. The method according to claim 1, which comprises distributing messages within the peripheral device with a central operating system section on the basis of a destination address, co-supplied via the message distribution system, of a virtual peripheral device.

3. The method according to claim 1, which comprises distributing messages to virtual peripheral devices via flexibly loaded routing tables of the message distribution system.

4. The method according to claim 1, which comprises administering a number of the virtual peripheral devices per peripheral device in dependence on performance, message interface, amount of memory, and application.

5. The method according to claim 1, which comprises supporting a loading of software into a virtual peripheral device via a same physical message channel of the assigned peripheral device.

6. The method according to claim 1, which comprises, in a case of permanent total failure of a peripheral device, updating the routing tables of the message distribution system, and then loading a reserved peripheral device with a program and data of the failed virtual peripheral devices and taking the reserved peripheral device into operation automatically without reacting on the further devices of the switching system.

7. The method according to claim 1, which comprises rescuing stable connections for duplicate-design peripheral devices or 1:1 redundant unduplicated peripheral devices, simultaneously updating the switching data memories and states of the virtual peripheral devices of the redundant unit per logic updating channel or updating channel physically present in the peripheral device.

* * * * *